(12) United States Patent
Brettfeld et al.

(10) Patent No.: US 7,093,874 B2
(45) Date of Patent: Aug. 22, 2006

(54) OVERHEAD CONSOLE LOCKING MECHANISM

(75) Inventors: Richard Brettfeld, Lake Orion, MI (US); Scott Munro, Windsor (CA)

(73) Assignee: DaimlerChrysler Corporation, Auburn Hills, MI (US)

( * ) Notice: Subject to any disclaimer, the term of this patent is extended or adjusted under 35 U.S.C. 154(b) by 282 days.

(21) Appl. No.: 10/741,835

(22) Filed: Dec. 19, 2003

(65) Prior Publication Data

US 2005/0134067 A1    Jun. 23, 2005

(51) Int. Cl.
*B60N 3/12*    (2006.01)
(52) U.S. Cl. .................................... 296/37.7; 296/37.8
(58) Field of Classification Search ............... 296/37.1, 296/37.7, 37.8; 224/311, 539
See application file for complete search history.

(56) References Cited

U.S. PATENT DOCUMENTS

| | | | |
|---|---|---|---|
| 6,203,088 B1 * | 3/2001 | Fernandez et al. | 296/37.8 |
| 6,244,648 B1 * | 6/2001 | Gackstatter | 296/37.8 |
| 6,572,169 B1 * | 6/2003 | Panhelleux et al. | 296/24.34 |
| 6,669,260 B1 * | 12/2003 | Clark et al. | 296/37.8 |
| 6,789,832 B1 * | 9/2004 | Gort et al. | 296/37.8 |
| 6,827,384 B1 * | 12/2004 | Anderson et al. | 296/37.8 |
| 6,921,118 B1 * | 7/2005 | Clark et al. | 296/24.34 |
| 6,957,839 B1 * | 10/2005 | Tiesler et al. | 296/24.34 |
| 2002/0163219 A1 * | 11/2002 | Clark et al. | 296/37.8 |
| 2003/0168875 A1 * | 9/2003 | Anderson et al. | 296/37.8 |
| 2004/0084920 A1 * | 5/2004 | Trimble et al. | 296/37.8 |
| 2005/0082862 A1 * | 4/2005 | Anderson et al. | 296/37.7 |
| 2005/0116487 A1 * | 6/2005 | Isaacson | 296/37.8 |

FOREIGN PATENT DOCUMENTS

WO    WO 2004/101318 A2    11/2004

* cited by examiner

*Primary Examiner*—Jason Morrow
(74) *Attorney, Agent, or Firm*—Thomas A. Jurecko

(57) ABSTRACT

An overhead console removably mounts to a rail system attached to a vehicle ceiling, the mounting system comprising a flange with a fixed projection on a first side, and a retractable catch on an opposing side. The fixed projection is adapted for inserting in a slot on its respective side rail. The retractable catch can be extended for insertion into a slot in its respective side rail. One embodiment of the retractable catch is a spring-loaded hook which is inserted into its slot against the bias of the spring, and engages the inside face of the slot under the force of the spring. The body of the hook bears on a lower side of the slot to hold the weight of the overhead console.

3 Claims, 1 Drawing Sheet

OVERHEAD CONSOLE LOCKING MECHANISM

BACKGROUND OF THE INVENTION

1. Field of the Invention

The invention relates to an article attachment system for the interior of an automobile.

2. Description of Related Art

An example of an overhead console assembly with removable modules is disclosed in U.S. Patent Application Publication 2003/0168875 dated Sep. 11, 2003. The removable modules are attached to parallel rail on a vehicle overhead by one of several mechanisms that are complex and expensive to produce.

It would be advantageous to develop an attachment system that is simpler to use, more robust, and economical.

BRIEF SUMMARY OF THE INVENTION

An overhead console is adapted for removably mounting to a rail system attached to a vehicle ceiling, the rail system comprising a pair of parallel side rails, the mounting system comprising a fixed flange with an inwardly extending projection for insertion in a slot formed on an outboard side of one of the pair of side rails, and a spring-loaded hook for selectively inserting in a slot formed on an outboard side of the other of the pair of side rails.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

Referring to FIGS. 1–4, an overhead console assembly 100 is adapted for mounting to a pair of parallel rails 110 mounted to a vehicle overhead. The console assembly 100 comprises a central cavity or module 120 for carrying or storing personal articles, or for housing vehicle accessories, such as are disclosed in U.S. Patent Application Publication 2003/0168875 A1 dated Sep. 11, 2003.

Figure 2:
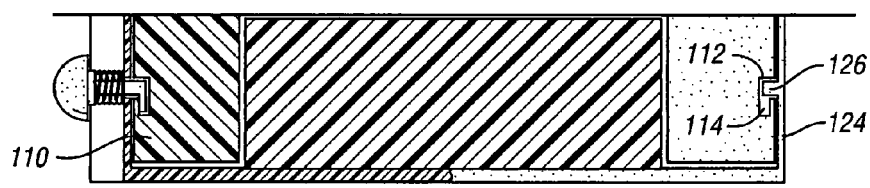
FIG. 2 is a cross-sectional view taken through line 2—2 of FIG. 1.
Figure 3:
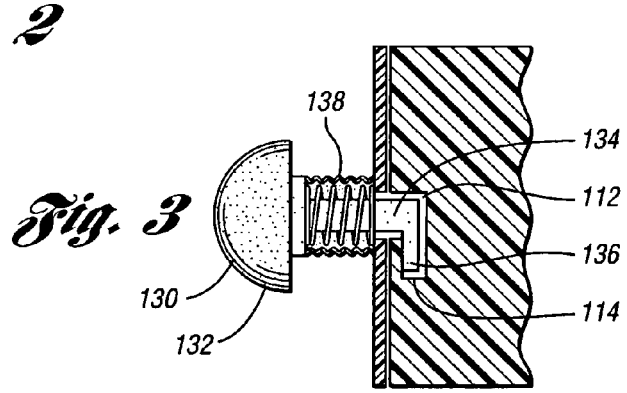
FIG. 3 is an enlarged cross-sectional view of the locking mechanism according to FIG. 2.
Figure 4:
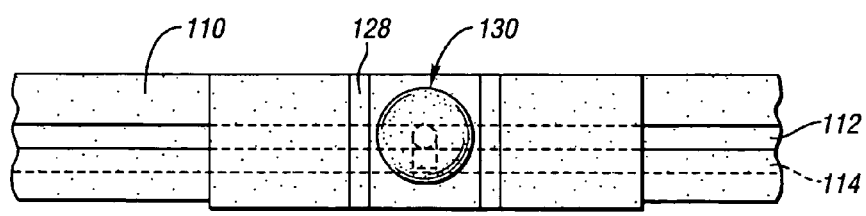
FIG. 4 is a side view of the overhead console locking mechanism of FIGS. 1–3.

Referring to FIGS. 2–4, each of the parallel side rails 110 includes a longitudinal rail slot 112 on an outboard face thereof. Each rail slot 112 includes a depending rail slot recess 114. The rail slots 112 of each side rail 110 are similarly configured for receiving like inserts.

Figure 1:
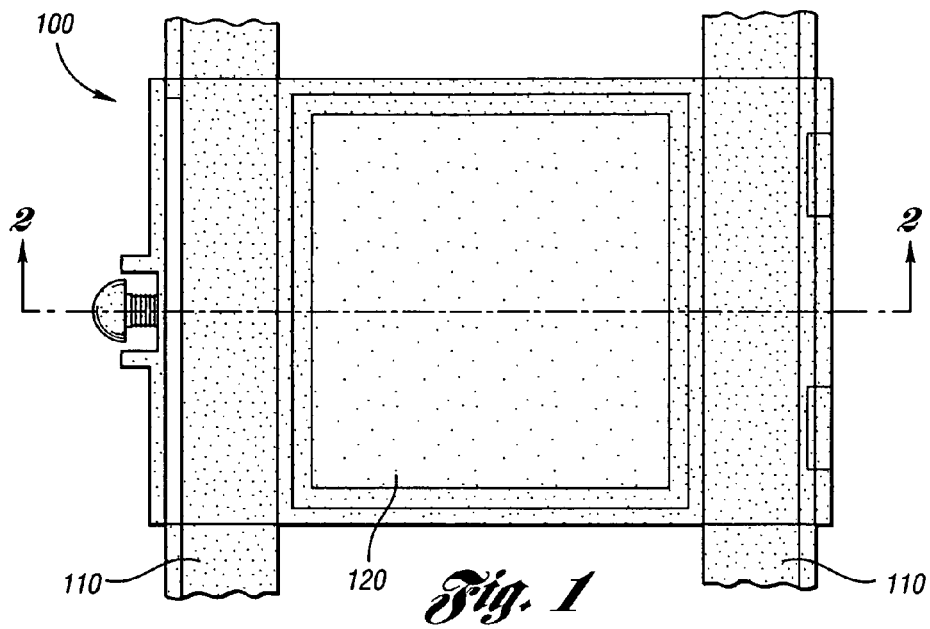
FIG. 1 is a plan view of an overhead console locking mechanism according to the invention.

The console assembly 100 includes a central module 120 joined with a pair of outboard parallel flange walls 122, 124. Wall 124 includes an inwardly extending projection 126, while wall 122 includes a spring-biased locking mechanism 130. The inwardly extending projection 126 can be a continuous longitudinal projection or a plurality of aligned projections 126 as shown in FIG. 1.

Referring particularly to FIG. 3, the locking mechanism 130 includes an extending pad or head 132 for actuation of the locking mechanism 130 by a user. The head 132 is connected to a central shaft 134 that terminates in a locking tab 136. The locking mechanism 130 biased outwardly from and retained to wall 122 by spring assembly 138. Guards 128 extend outwardly from wall 122 on either side of locking mechanism 130.

For installation of the console assembly 100 on rails 110, console assembly 100 is raised onto rails 110 with central module 120 between rails 110 until projection 126 aligns with one of the rail slots 112. The assembly 100 is then shifted slightly so that projection 126 is received in the slot 112. On the opposing side of console 100, locking tab 136 is arranged to be parallel with slot 112. Head 132 on locking mechanism 130 is then depressed against the bias of spring assembly 138 until the end of shaft 134 and locking tab 136 are inserted into slot 112 to the depth of recess 114. Head 132 and shaft 134 are then rotated so that locking tab 136 is rotated for insertion into recess 114. Head 132 is then released so that spring assembly 138 biases locking tab 136 against a side of recess 114 for retention within recess 114.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. An article attachment system for a vehicle interior having a first elongate rail adapted for mounting in the vehicle interior, a second elongate rail adapted for mounting in the vehicle interior substantially parallel to the first elongate rail, and at least one article adapted for attaching to the first and second elongate rails, the article including a first mounting member comprising a fixed projection, wherein the first elongate rail further comprises a recess for receiving the first mounting member of the article, and the article is adapted for attaching to the first and second elongate rails by inserting the fixed projection into the recess of the first elongate rail, the system comprising:

a second mounting member of the article having a shaft extending from an actuation pad to a transverse catch and biased by a spring to a locking configuration, wherein the article is further adapted for attaching to the first and second elongate rails by applying a compressive force to the actuation pad to compress the spring and insert the transverse catch into a recess of the second elongate rail, and removing the force from the actuation pad for engaging the catch within the recess of the second elongate rail.

2. The system of claim 1 wherein the actuation pad comprises a pushbutton arranged to be depressed inwardly toward the storage console to compress the spring.

3. The system of claim 1 wherein the actuation pad is arranged to be rotated in a direction relative to the article prior to the shaft being inserted into the recess of the second elongate rail, and further arranged to be rotated in an opposite direction prior to removing the compressive force for engaging the catch within the recess of the second elongate rail.

* * * * *